J. J. HOMANS.
EXTRACTING JUICE FROM SUGAR CANE OR SUGAR BEET
APPLICATION FILED OCT. 26, 1909.
978,451.
Patented Dec. 13, 1910.
2 SHEETS—SHEET 1.
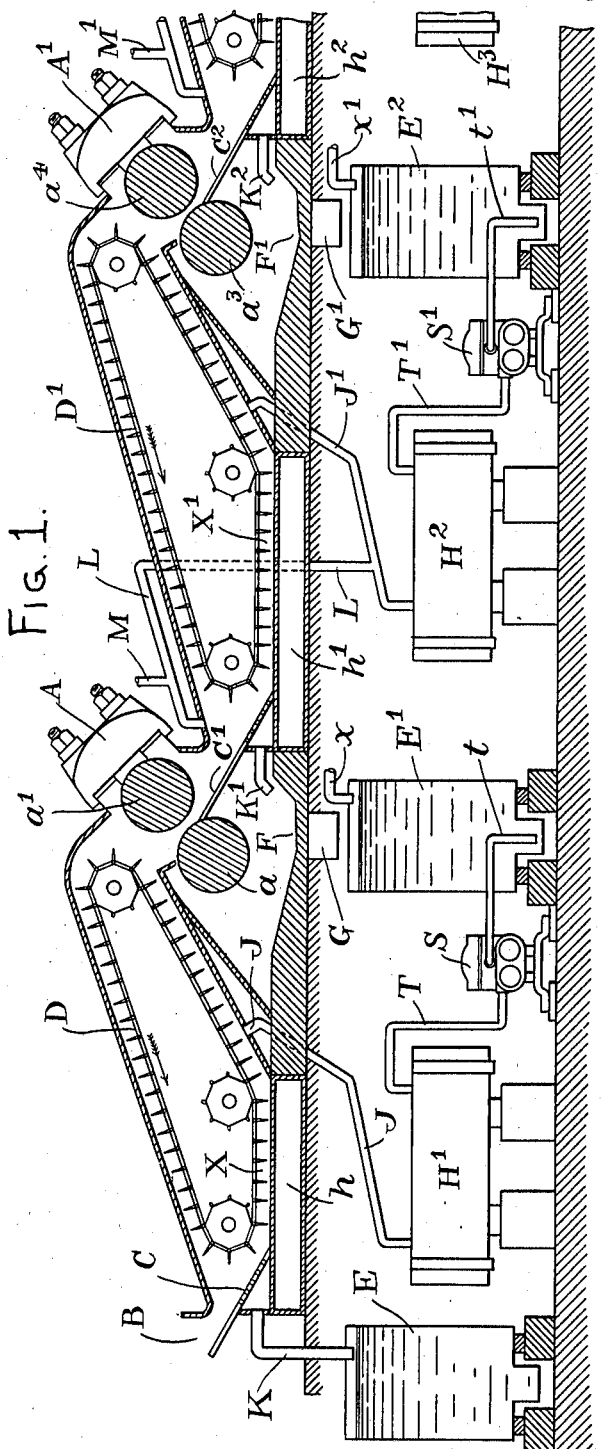
WITNESSES:
David J. Walsh
W. H. Berrigan
INVENTOR
JACOBUS JOHANNES HOMANS,
BY
H. van Hennee
ATTORNEY.

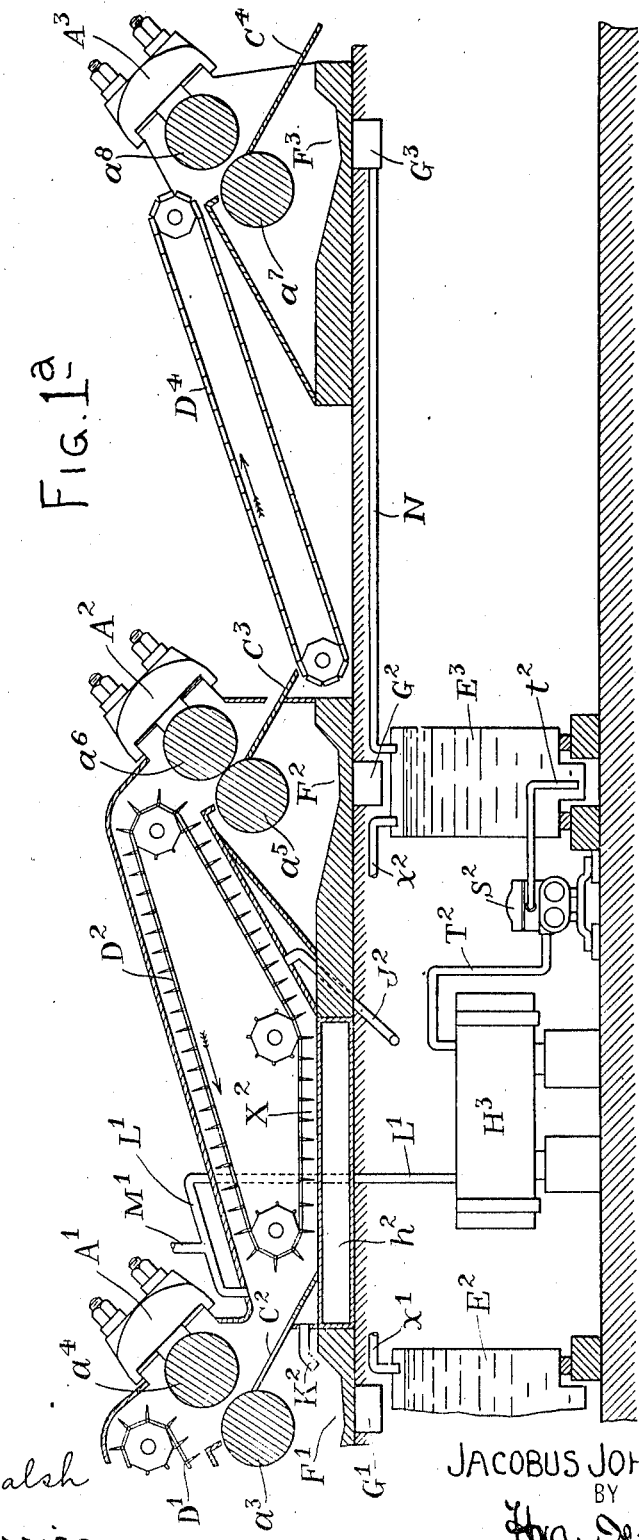

UNITED STATES PATENT OFFICE.

JACOBUS J. HOMANS, OF SAMARANG, JAVA.

EXTRACTING JUICE FROM SUGAR-CANE OR SUGAR-BEET.

978,451. Specification of Letters Patent. Patented Dec. 13, 1910.

Application filed October 26, 1909. Serial No. 524,672.

*To all whom it may concern:*

Be it known that I, JACOBUS JOHANNES HOMANS, a subject of the Queen of the Netherlands, and residing at Samarang, county of Samarang, Isle of Java, have invented a new and useful Improvement in Extracting Juice from Sugar-Cane or Sugar-Beet; and I do hereby declare the following to be a full, clear, and exact description of the same.

This invention relates to processes for extraction of sugar-juice (the raw juice or sap) from sugar-producing vegetable material, such as sugar-cane and sugarbeet.

The process which I have invented comprises, for the best practice thereof, and in the most complete form, the following steps: heating sugar-cane or sugarbeet (preferably, in shredded or other finely-divided state) before any initial squeezing or crushing of said vegetable substance, sufficiently to kill the cells and to cause coagulation of the albumen, and preferably by soaking said vegetable material in hot liquid (for instance, hot sugar-juice) which is delivered from a following extraction, and moving in a direction opposite that of the vegetable material; then, after the first squeezing, macerating the bagasse (pulp) or soaking the same—or both—with heated sugar-juice, or other heated liquid, to dilute retained sugar-juice; then again squeezing said saturated bagasse, and repeating the addition of heated liquid to squeezed bagasse, and then squeezing the latter, as often as desired, until the bagasse is practically free of all sugar-juice. In every case where hot liquor is added to the bagasse, I prefer that it shall be in quantity sufficient to soak the bagasse and that it shall move therethrough in a direction opposite that of the movement of said bagasse. The bagasse is continuously (repeatedly) heated during the juice-extracting operations, but the temperature is insufficient and of too short a duration to dissolve or separate out the pectin and xylan, or other fiber substances, which are consequently retained by and discharged with the bagasse. Owing to the retention, in the bagasse, of the mentioned substances, the sugar-juice is quite clear, being in fact much clearer than that resulting from the mill process (which squeezes out the albumen, pectin and coloring matters, from the sugar-cane or sugar-beet), and is in fact as clear as, but of greater purity than, juice resulting from the diffusion process, which utilizes a long-continued heating, and, consequently, releases alkali (salt) and fiber substances.

Another highly-useful step, preferably embodied in my process, consists in the incorporation with the bagasse of scum (resulting from clarifying sugar-juice) so that such scum may be freed of sugar-juice, and the scum precipitates afterward burned with the bagasse. It is well known that the scum from the clarification process retains large quantities of sugar-juice, and the latter has usually been recovered by an expensive process, including repeated filtering.

One novelty of my process consists in adding scum (still containing the recoverable sugar-juice) to squeezed bagasse, causing the latter to become imbibed with the scum, and the bagasse is then squeezed, with the result of driving the scum precipitates into (or incorporating it with) the bagasse, and the squeezing out and recovery of the sugar-juice previously held by the scum.

The results of my process are, therefore, (1) maximum quantities of clear sugar-juice, and (2) bagasse or pulp containing all fuel or fodder substances and more completely than heretofore relieved of sugar-juice.

The accompanying drawing, which is partly diagrammatic and also shows sections of the roller mills employed, illustrates a plant for extracting juice according to my present invention. Said plant utilizes four "two-roller" mills, a form of mill invented by me and found to have great advantages as compared with the "three-roller" mills heretofore usually employed. I have also found that, for crushing a given amount of cane (with extraction of practically a like amount of juice) in each case, the two-roller mill plant requires about half the steam usually taken by a three-roller mill plant. There is also, with the new arrangement, much less liability to breakage of the parts. In point of speed, also, I have found that the two-roller mills allow (as compared with three-roller mills) twice as many (or more) revolutions in a given time, with a corresponding increase in the amount of cane crushed. For the reasons mentioned, I prefer to employ the two-roller mills which dispense with bagasserollers and have, as shown in the drawings, the feed and head-rollers relatively disposed as in three-roller mills heretofore employed.

In the drawing, I have shown the first mill, A, with feed-roller $a$ and head-roller $a^1$, a second mill, $A^1$, with feed-roller $a^3$ and head-roller $a^4$, a third mill, $A^2$, with feed-roller $a^5$ and head-roller $a^6$, and a fourth mill, $A^3$, with feed-roller $a^7$ and head-roller $a^8$.

B indicates any suitable form of hopper or intake for sugar-cane after it has left a cane-crusher, or a cane cutter or shredder. This crushed or finely-divided material falls down the inclined perforated plate, C, and into a box or tank X, the bottom of which is formed by or is in contact with a heating compartment $h$. The finely-divided cane (chips, or other form) is subjected, in said pan or tank X, to a heat sufficient to kill the cells and to cause the albumen to coagulate. That desirable result will be attained by heating the chips or adding to the chips, or flooding the same with, heated sugar-juice or other heated liquor, and by keeping the mass, by the aid of the heating compartment $h$, at about 75° C., the temperature ordinarily employed in the diffusion process. By killing the protoplasm in the cells, the cell-walls become pervious, and the juice easily leaves the cells, without the breaking of the walls, by the heavy pressure in the mills, of many more cells previously opened by the cutter or the shredder. The coloring matter, the albumen, the pectin and xylan remain in the cells, thus yielding a juice containing considerably less of the impurities than in the juice obtained by the usual extraction processes.

There are several ways to heat the cane, or the divided cane, for instance, by hot sugar-juice, by hot water, by steam, air or gases; the most economical method is by the supplying of hot sugar-juice, and in a macerating apparatus, as herein described. If there is hot waste-water in the factory, the cane or beet may be heated and cleaned with said water before any dividing or crushing of the cane or beet. Excess of heated liquid supplied to tank X will drain through the perforations of plate C, and will then, by pipe K, enter tank E. From this tank, the juice is taken for any further treatment desired; for instance, it may have lime added thereto, and thereafter be subjected to a clarification treatment, such as that set forth in my co-pending application, Serial No. 522319, filed October 12, 1909. The finely-divided cane is, as fast as supplied to tank X, drawn therethrough by a chain-like conveyer D, which may have rakes or perforated plates, and said conveyer then draws the cane to the first (A) of the two-roller mills; the rolls $a$ and $a^1$ squeeze juice from the cane, and pass the bagasse to an inclined perforated plate $C^1$. Juice squeezed out by this mill includes that supplied by pipe J and retained by the chips, as well as a large quantity of the original sugar-juice of the cane; it falls from in front of the feed-rollers $a$ into a basin F, drains from thence to a trough G, and is led by the latter into a second tank, $E^1$. A pump S forces juice from said tank, by way of pipes $t$ and T through a heater $H^1$ and pipe J, to heat the chips in tank X. As the bagasse leaves the mill A and passes over the perforated plate $C^1$, it is macerated by the addition of hot liquor delivered through a pipe, L. The bagasse having been squeezed quite dry, readily imbibes the hot liquid poured thereon, and then falls easily into juice in another box or tank, $X^1$, the slightly-inclined bottom of which is formed by or is in contact with a heating compartment $h^1$. A chain conveyer $D^1$, having rakes or perforated plates, draws the bagasse through said tank, and upwardly—along an inclined path—toward the second mill, $A^1$. The chain should be about ten inches above the bottom of the tank, so as to draw the swollen bagasse without pressure thereon. The juice squeezed out by the second mill ($A^1$) falls into a basin $F^1$, thence to trough $G^1$, and into tank $E^2$; from this tank, it is forced by pump $S^1$, by way of pipes $t^1$ and $T^1$, into heater $H^2$, wherein the juice is heated (preferably to 100° C.). This hot juice may then be delivered by pipe L—as before stated—for maceration purposes, and also by a pipe $J^1$ into the bagasse-storing tank, $X^1$, at a point near to that whereat the bagasse is drawn from the tank by the chain-conveyer. The hot juice, as delivered by said pipe $J^1$, flows through the bagasse—in a direction opposite the movement of the latter—exhausting the bagasse, and finally the unabsorbed juice passes out through the perforations of the plate $C^1$, and then, by way of pipe $K^1$, the juice is discharged to be received in tank $E^1$. The pipe $K^1$ is located a little lower than the horizontal part of the chain-conveyer, so that the level of the juice in tank $X^1$ is a little below that conveyer. As will be seen, the apparatus is covered by heating protection, having only the necessary openings for the entrance and discharge of the bagasse. The bagasse squeezed by the second mill ($A^1$) falls upon an inclined perforated plate $C^2$, and is there macerated by the addition of hot liquor delivered through a pipe $L^1$. This pipe may be connected with a heater $H^3$, and will then deliver heated sugar-juice to bagasse in quite dry condition, eager to imbibe the hot liquor. The macerated bagasse then falls easily into juice in a third box or tank, $X^2$, the bottom of which is formed by or is in contact with a heating compartment $h^2$. A chain-conveyer $D^2$ (which may, like $D^1$, have rakes or perforated plates) draws the bagasse through said tank $X^2$, without exerting pressure thereon. Juice squeezed out by mill $A^2$ (the third mill) falls into a basin $F^2$, thence to trough $G^2$, and into tank $E^3$; from said tank, the juice is forced by a pump $S^2$, by way of pipes $t^2$ and $T^2$, into heater $H^3$, wherein the juice is heated to be delivered by pipe $L^1$—as before stated for maceration purposes. Hot water (as much as the usual quantity for maceration of the bagasse) is supplied, by a pipe $J^2$, into the bagasse-storing tank $X^2$, at a point near to that whereat the bagasse is drawn from the tank by the chain-conveyer. Said supplied hot water flows through the bagasse—in a direction opposite the movement of the latter—exhausting the bagasse, and finally the unabsorbed liquor passes out through the perforations of the plate $C^2$, and afterward, by way of pipe $K^2$, is discharged to be received in tank $E^2$. Pipe $K^2$ is located a little lower than the horizontal part of chain-conveyer $D^2$, to keep the level of liquid in tank $X^2$ a little below that conveyer. Bagasse discharged from the third mill ($A^2$) falls upon an inclined plate $C^3$ and is delivered thereby to the upper side of a bagasse-conveyer $D^3$, and, by the latter, carried to the last mill $A^3$; it then passes between the feed-roller, $a^7$, and the head-roller, $a^8$, to a plate $C^4$, and from the apparatus. Juice squeezed out by mill $A^3$ falls into basin $F^3$, and by trough $G^3$ and a pipe N, is led to the tank $E^3$.

Whenever desired (for instance, when the apparatus is to be started up) hot water may be supplied by one or more of the tanks $E^1$, $E^2$, $E^3$, through the corresponding faucet or faucets of those lettered $x^1$, $x^2$, $x^5$.

It will be obvious that the oftener the bagasse is macerated, the more thoroughly it will be exhausted of sugar-juice.

When there is a maceration between the third and last mills, it is preferable that the last mill be a three-roller mill, as a two-roller mill (or a three-roller mill for which the "bagasse-roller", has been omitted) may not sufficiently express the juice from and dry the bagasse.

Resuming, I describe the process as follows: The finely divided material is heated to a temperature above 60° Cels. sufficient to kill the cells, while moving to a squeezing operation, preferably by thoroughly soaking and macerating said material in hot and diluted juice, delivered from succeeding squeezing and macerating operations, flowing in a direction opposite to that of said material, while excess of juice leaves for the clarification process, and is then squeezed. These macerating and squeezing operations, while excess of juice leaves for thoroughly soaking and macerating the material before each preceding squeezing operation, are repeated as practicable as possible. Finally the squeezed material is imbibed with the most diluted juice delivered from the last squeezing operation and then, while moving to the last squeezing, thoroughly soaked and macerated with water, flowing in a direction opposite to that of said material, while excess of diluted juice leaves for soaking and macerating the material before the preceding squeezing and is then finally squeezed in a required dry condition.

The drawing and the foregoing description make clear how the juice from all macerators and mills finally enters in the first macerator between the cane divider and the first mill, and then leaves for any clarification process.

While I prefer (for economical reasons before set forth) to use two-roller mills or a multiple of these, yet my process may be practiced by the aid of any usual mills.

Another advantage which I have found resulting from my invention of hot maceration of bagasse, is that scum from a defecation process may be macerated upon the bagasse and the precipitates of the scum incorporated therewith. I have found that when such scum is macerated upon bagasse, and the mass is heated to a temperature not lower than the "cracking point" (94° C.–95° C.) of the defecating process, and then pressed, while at about said temperature, the precipitates of the scum remain in the bagasse and clear juice flows from the latter. If the mentioned temperature is not substantially maintained, the precipitates of the scum do not completely incorporate with the bagasse. Availing myself of this discovery, I may convey the raw juice or sap, which is treated before with lime, or the scum—for instance as separated by centrifugal action, in accordance with my aforesaid co-pending application—preferably at a temperature lower than 94° C., onto the bagasse as it leaves the first mill or the second mill, or at both places, using either or both pipes M and $M^1$, and after a maceration with scum, heat the bagasse (by steam, gases or hot juice) to the desired temperature, and thereafter taking care that, during the squeezing, the temperature does not fall below that of the said "cracking point". Under such circumstances, juice is separated from the scum, and the latter is incorporated in the bagasse. It is useful to render the scum or sap alkaline with a small quantity of lime before adding to the squeezed material. I desire it to be understood that the temperature of the mass (pulp or bagasse containing scum or the incorporated precipitates) must be maintained, prior to or during each squeezing, not lower than that of said "cracking point" of the defecation process. Another method for accomplishing this desirable result, will be to take some (say 1/10) of the bagasse from the last mill, and to macerate with scum, heat and press, extracting by a press, for instance an hydraulic press or a small mill, maintaining the temperature, during the extraction, not lower than that of the "cracking point" of the defecation process. The squeezed bagasse may be repeatedly used in this way, as it has the property of holding a great quantity of precipitates from scum. The second method is less advantageous, requiring separate machines and additional laborers, and some sugar is lost in the bagasse. Also extra fuel is required to bring the bagasse to the desired temperature. Scum from the carbonation or any other clarification process may usually be macerated upon the bagasse and clarified in the same way, but preferably at a temperature not lower than about 94° C.–95° C.

I desire it to be understood that when I use the word "scum", in this specification and claims, I mean thereby all muddy residue separated from the sugar-juice.

The apparatus herein described, and shown in the drawings, constitutes the subject-matter of an application, Serial No. 544319, filed February 16, 1910, as a division of this application.

While hereinbefore I have especially mentioned sugar-cane, I desire it to be understood that the process and steps are also useful in extraction of sugar-juice from sugar-beets, and in clarifying scum from such sugar-juice on pulp or bagasse.

What I claim is:

1. In the extraction of juice from sugar-producing vegetable material, the process which consists in squeezing said material, then adding thereto scum separated from sugar-juice, heating the mass to a temperature not lower than that of the "cracking point" of the defecation process, and, while still maintaining the mass at said temperature, squeezing the mass for extraction of juice and to incorporate precipitates of the added scum with the squeezed material.

2. In the extraction of juice from sugar-producing vegetable material, the process which consists in squeezing said material, then adding thereto scum separated from sugar-juice, thoroughly soaking said material, while maintaining the whole at a temperature not lower than that of the "cracking point" of the defecation process, with liquid flowing through said material, and, while still maintaining the mass at said temperature, squeezing the mass for extraction of juice and to incorporate precipitates of the added scum with the squeezed material.

3. In the extraction of juice from sugar-producing vegetable material, the process which consists in squeezing said material, then while moving the material toward another squeezing, adding thereto scum separated from sugar-juice, thoroughly soaking said material, while maintaining the whole at a temperature not lower than that of the "cracking point" of the defecation process, with juice obtained by the last-mentioned squeezing and with hot water flowing through the vegetable material in a direction opposite to the movement of the latter, and, while still maintaining the mass at said temperature, subjecting the same to the second-mentioned squeezing, for extraction of juice and to incorporate precipitates of the added scum with the material.

4. In the extraction of juice from sugar-producing vegetable material, the process which consists in squeezing said material, then adding thereto scum separated from sugar-juice, heating the mass to a temperature not lower than that of the "cracking point" of the defecation process and squeezing the mass for extraction of juice and to incorporate precipitates of the added scum with the squeezed material, and thereafter adding to said mass water and again squeezing the mass while maintaining the mass at said temperature.

5. In the extraction of juice from sugar-producing vegetable material, the process which consists in squeezing said material, then adding thereto scum separated from sugar-juice, heating the mass to a temperature not lower than that of the "cracking point" of the defecation process and squeezing the mass for extraction of juice and to incorporate precipitates of the added scum with the squeezed material, and thereafter adding to said mass diluted juice from following squeezings, and thereafter squeezing the mass, then adding to the mass water and again squeezing, while maintaining the mass during the last-mentioned squeezings at said temperature.

6. In the extraction of juice from sugar-producing vegetable material, the step which consists in squeezing a mixture of previously-squeezed material and scum separated from sugar-juice, while maintaining the temperature of the mass not lower than that of the "cracking point" of the defecation process, for extraction of juice and to incorporate precipitates of the added scum with the squeezed material.

In testimony whereof, I have signed my name to this specification in the presence of two subscribing witnesses.

J. J. HOMANS.

Witnesses:
 W. H. BERRIGAN,
 JOHN H. HOVING.